US011246082B1

United States Patent
McConnell et al.

(10) Patent No.: US 11,246,082 B1
(45) Date of Patent: Feb. 8, 2022

(54) WIRELESS COMMUNICATION FOR END NODE

(71) Applicant: BluWireless Technology Limited, Bristol (GB)

(72) Inventors: Raymond Mark McConnell, Bristol (GB); Chaitanya Tata, Hyderabad (IN)

(73) Assignee: BluWireless Technology Limited, Bristol (GB)

(*) Notice: Subject to any disclaimer, the term of this patent is extended or adjusted under 35 U.S.C. 154(b) by 0 days.

(21) Appl. No.: 17/062,134

(22) Filed: Oct. 2, 2020

(51) Int. Cl.
*H04W 48/08* (2009.01)
*H04W 72/04* (2009.01)
*H04W 72/08* (2009.01)
*H04L 5/00* (2006.01)
*H04W 36/00* (2009.01)

(52) U.S. Cl.
CPC .......... *H04W 48/08* (2013.01); *H04L 5/0032* (2013.01); *H04W 36/00835* (2018.08); *H04W 72/044* (2013.01); *H04W 72/085* (2013.01)

(58) Field of Classification Search
CPC .... H04B 7/0695; H04B 7/0617; H04B 7/088; H04B 7/0452; H04W 16/28; H04W 72/1263
See application file for complete search history.

(56) References Cited

U.S. PATENT DOCUMENTS

| | | | | |
|---|---|---|---|---|
| 2015/0245251 A1* | 8/2015 | Somayazulu | ......... | H04W 36/32 370/329 |
| 2016/0099761 A1* | 4/2016 | Chen | .................... | H04B 7/0408 370/336 |
| 2017/0111806 A1* | 4/2017 | Roh | ..................... | H04W 72/042 |
| 2019/0037397 A1* | 1/2019 | Trainin | ................. | H04W 12/06 |
| 2019/0045583 A1* | 2/2019 | Van Phan | ............. | H04W 76/15 |
| 2020/0022201 A1* | 1/2020 | Ross | ..................... | H04W 76/15 |
| 2020/0120458 A1* | 4/2020 | Aldana | ............... | H04W 72/048 |

FOREIGN PATENT DOCUMENTS

WO WO-2019120479 A1 * 6/2019 ............. H04W 4/40

* cited by examiner

*Primary Examiner* — Dung Hong
(74) *Attorney, Agent, or Firm* — Optimus Patents US, LLC

(57) ABSTRACT

A communication system supports communication between an end node (101) of a vehicle (103) and a remote correspondent node (105) via a fixed network (107) which comprises a plurality of wireless access points (109) with a directional antenna arrangement for mm wave radio communication using directional beams. A vehicle (103) comprises wireless modems (111, 113, 701, 703) employing electronically steerable beamforming directional antennas for establishing mm wave radio communication links to the access points (109). The air interface communication may use a frequency channels selected from a set of available frequency channels and using a transmission scheme from a set of available transmission schemes. The access points (109) transmit a first beacon data set in a frequency channel using a common transmission scheme and a second beacon data set using a different transmission scheme which is also used for data communication. The first beacon data set comprises an indication of the transmission schemes used for data communication for the access point (109).

20 Claims, 12 Drawing Sheets

WIRELESS COMMUNICATION FOR END NODE

FIELD OF THE INVENTION

The invention relates to support of communication between an end node and a remote correspondent node, and in particular, but not exclusively, to wireless communication supporting a mobile end node.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

A general problem is that in order to support high capacity communication with, in particular, a fast-moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast-moving vehicles using millimeter-wave (mm) wavelength-based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast-moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast-moving vehicles tend to be suboptimal.

A particularly critical issue is that of how to control the dynamic formations and terminations of mm wave radio communication links between access points and wireless modems such that the overall communication capacity and air interface resource is optimized as much as is possible. This is a very difficult problem for mm wave radio communication links and fast changing conditions as occur for (fast) moving vehicles.

The described issues are not limited to mobile applications but may also occur for systems in which nodes and devices are fixed or static. Indeed, for mm wave radio communication links, the propagation conditions typically change very substantially and possibly quickly due to changes in the environment. For example, changing weather conditions, moving objects (e.g. cars) etc. may substantially and quickly change the propagations and properties of the individual link.

A particular problem is that for systems that are based on or derived from systems that are not optimized for fast mobility and/or quick link adaptation, the procedures may not provide optimum performance and may substantially restrict or degrade the performance that can be achieved. For example, IEEE 802.11ad utilizes a number of operations and functions developed in relation to other previous IEEE 802 systems and standards. However, applying such functions in IEEE 802.11ad may tend to not provide optimum performance. In particular, they may often provide performance that tends to be too slow, complex and/or resource demanding.

As a specific example, selection of a supporting access point may be based on a search or scan of the frequency spectrum to identify beacon transmissions from nearby access points. However, such scanning tends to be slow and require substantial resource and may thus result in suboptimal link selection and updating. In particular, it may often be too slow for optimum performance in a fast-changing radio environment, e.g. resulting from fast movement of a mobile node.

Hence, an improved approach for supporting communication via mm wave radio communication links would be advantageous. In particular, an approach that allows improved operation, improved reliability, increased flexibility, facilitated implementation, facilitated operation, improved resource utilization and in particular air interface resource utilization, improved handover performance, increased over the air communication capacity, improved performance, facilitated and/or improved and/or faster link management and updating, and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node and a remote correspondent node via a fixed network, the communication system comprising: a plurality of wireless access points of the fixed network, each wireless access point having a directional antenna arrangement for mm wave radio communication using directional beams, a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links; wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points; band at least some access points of the plurality of access points are arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

The invention may provide improved and/or facilitated operation and/or improved performance for a beamform based mm wave radio communication system supporting (potentially fast) propagation changes, such as e.g. experienced for moving vehicles. The approach may, in particular, provide efficient and reliable communication and may in many embodiments provide improved utilization of the available air interface resource. The approach may in many embodiments provide improved consistency and reduced data interruption and/or performance degradation.

The approach may provide improved performance in many embodiments and scenarios. It may in many scenarios provide improved a substantially setup of new links. The approach may allow a fast yet reliable identification of suitable target access points. It may in many embodiments substantially reduce the time required to scan for suitable target access points while at the same time supporting potentially many different subchannels.

A first beacon data set is a beacon data set transmitted using the common transmission scheme. The data or content of different first data beacon sets may be different, in particular the data or content of first data beacon sets transmitted from different access points may be different. A second beacon data set is a beacon data set transmitted using a transmission scheme different from the common transmission scheme. The data or content of different second data beacon sets may be different, in particular the data or content of second beacon data sets transmitted from different access points may be different.

A combination of a frequency channel and transmission scheme may be referred to as a subchannel. The common transmission scheme may be a transmission scheme of the plurality of transmission schemes. A transmission scheme may in some applications, embodiments, and/or scenarios be considered to be a combination of a frequency channel and a transmission scheme and may in applications, embodiments, and/or scenarios be considered to be a transmission scheme independent of a frequency channel. A transmission scheme may correspond to a frequency use/distribution within a frequency channel and different transmission schemes may correspond to different frequency use/distribution within a frequency channel.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

A search or scan for access points may include searching for transmissions from different access points. The searching for transmissions may be used to detect access points that can support setup of a mm wave radio communication link. The detection may include a determination of a radio propagation measure for an access point from which a transmission is detected. An access point may be considered to be able to support setup of a mm wave radio communication link if the radio propagation measure for the access point meets a criterion, such as specifically a radio propagation quality criterion. The scanning may include a search over a plurality of transmission channels. At least some of the transmission channels may have different frequency bands and/or time intervals and/or code division codes and/or identifiers.

The end node may an end node of a vehicle and the wireless modem may be located on the vehicle. The wireless modems, controller, and/or end node may be in/on/attached to/move with etc. the vehicle, and may be part of a mobile network that moves with the vehicle.

The wireless modem may be coupled to the end node, e.g. via a network.

According to an optional feature of the application, the plurality of transmission schemes comprise transmission schemes having at least one of: different frequency bandwidths; and different frequency offsets.

According to an optional feature of the application, the second beacon set comprises an indication of the subset of transmission schemes.

According to an optional feature of the application, the wireless modem comprises: a first search circuit arranged to perform a first search for first beacon data sets transmitted from the plurality of access points using the common transmission scheme; a second search circuit arranged to perform a second search for second beacon data sets transmitted from the plurality of access points using the set of transmission schemes, the second search being adapted in response to the indication of the subset of transmission schemes used by the plurality of access points; and a link management circuit arranged to initialize setting up a mm wave radio communication link to a target access point from which a second data set has been detected.

The approach may provide improved performance in many embodiments and scenarios. It may in many scenarios provide improved a substantially setup of new links. The approach may allow a fast yet reliable identification of suitable target access points. It may in many embodiments substantially reduce the time required to scan for suitable target access points while at the same time supporting potentially many different subchannels.

The second search circuit may be arranged to perform a second search for second beacon data sets transmitted from the plurality of access points using transmission schemes of the set of transmission schemes not including the common transmission scheme.

According to an optional feature of the application, the second search circuit is arranged to adapt the second search to initially search for second beacon data sets transmitted using transmission schemes comprised in the first subset of transmission schemes.

According to an optional feature of the application, the second search circuit is arranged to search over transmission schemes of the set of transmission schemes not comprised in the subset of transmission schemes if the second search over the transmission schemes comprised in the subset of transmission schemes does not detect any second beacon data sets.

According to an optional feature of the application, the indication of the subset of transmission schemes used by the plurality of access points comprises an indication of an order of transmission schemes, and the second search circuit is arranged to adapt the second search to search for second beacon data set to follow the order of transmission schemes in the indication of the subset of transmission schemes.

According to an optional feature of the application, the link management circuit is arranged to select the target access point from a plurality of target access points from which second data sets have been detected in response to a quality measure determined for the target access points.

According to an optional feature of the application, the first search circuit is arranged to terminate the first search and to start the second search when a first beacon data set has been received.

According to an optional feature of the application, the second search circuit is arranged to search over all transmission schemes of the set of transmission schemes if the first search does not detect any first beacon data sets.

According to an optional feature of the application, the second search circuit is arranged to initially search over transmission schemes of a default subset of transmission schemes if the first search does not detect any first beacon data sets.

According to an optional feature of the application, the second search circuit is arranged to determine the default subset of transmission schemes in response to previously received first beacon data sets.

According to an optional feature of the application, the second search circuit is arranged to search over transmission schemes of the set of transmission schemes not comprised in the subset of transmission schemes if the first search does not detect any first beacon data sets.

According to an optional feature of the application, at least a first access point of the plurality of access points is arranged to receiving indications of previously used transmission schemes from wireless modems, and further comprising a subset circuit for generating the indication of the subset of transmission schemes used by the plurality of access points in response to the indications of previously used transmission schemes.

According to an optional feature of the application, the first beacon data set comprises an indication of a subset of frequency channels of the plurality of frequency channels used by the plurality of access points.

In some embodiments, the second search circuit is arranged to adapt the second search in response to the indication of the subset of frequency channels.

In some embodiments, the first search circuit is arranged to adapt the first search in response to the indication of the subset of frequency channels.

According to an optional feature of the application, the first beacon data set for at least a first access point of the plurality of access points comprises an indication of a transmission scheme used by the first access point.

According to an optional feature of the application, at least one access point of the plurality of access points is arranged to transmit first beacon data sets using a broader beam than a beam used for transmitting the second beacon data set.

According to an optional feature of the application, the first beacon data set for at least a first access point of the plurality of access points comprises an indication of a transmission scheme used by the first access point.

According to an optional feature of the application, at least one access point of the plurality of access points is arranged to transmit first beacon data sets using a broader beam than a beam used for transmitting the second beacon data set.

According to an aspect of the invention, there is provided an access point for a communication system for supporting communication between an end node and a remote correspondent node via a fixed network, the communication system comprising:

a plurality of wireless access points of the fixed network, each wireless access point having a directional antenna arrangement for mm wave radio communication using directional beams, a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links;

wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points;

the access point comprising:

the access point being arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

According to an aspect of the invention, there is provided a wireless modem for a communication system for supporting communication between an end node and a remote correspondent node via a fixed network, the communication system comprising: a plurality of wireless access points of the fixed network, each wireless access point having a directional antenna arrangement for mm wave radio communication using directional beams, wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points; and at least some access points of the plurality of access points are arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points; the wireless modem being arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links; and the wireless modem further comprising: a first search circuit arranged to perform a first search for first beacon data sets transmitted from the plurality of access points using the common transmission scheme; a second search circuit arranged to perform a second search for second beacon data sets transmitted from the plurality of access points using the set of transmission schemes, the second search being adapted in response to the indication of the subset of transmission schemes used by the plurality of access points; and a link management circuit arranged to initialize setting up a mm wave radio communication link to a target access point from which a second data set has been detected.

According to an aspect of the invention, there is provided a method of operation for a communication system for supporting communication between an end node and a remote correspondent node via a fixed network, the communication system comprising: a plurality of wireless access points of the fixed network, each wireless access point having a directional antenna arrangement for mm wave radio communication using directional beams, a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links; the method comprising: each of the access points of the plurality of access points communicating during data time intervals using a combination of a frequency channel of the set of frequency channels and a transmission scheme from the set of transmission schemes, the combination of the frequency channel and transmission scheme being different for at least some access points of the plurality of access points; and at least some access points of the plurality of access points transmitting a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and transmitting a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a mm wave radio communication system supporting mobile vehicle-based nodes. However, it will be appreciated that the invention is not limited to this application but may be applied to many other mm wave radio communication systems including systems that do not support mobility. In particular, the description will focus on providing communication support for a vehicle-based end node via a wireless modem also located on the vehicle. However, in other embodiments the wireless modem, and possibly the end node, may be static or fixed.

Figure 1:
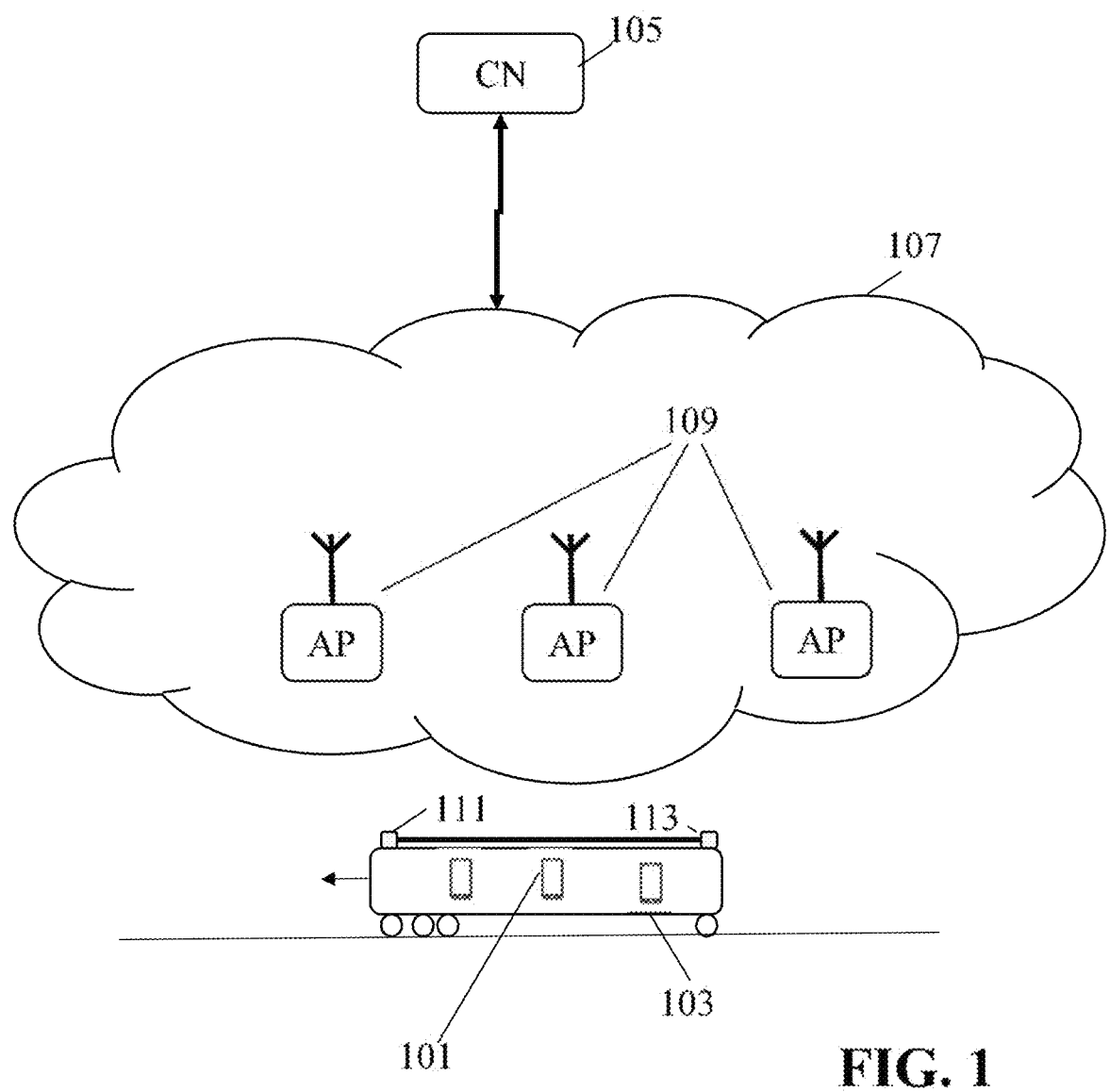
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/ where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90-degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast-moving train.

Figure 2:
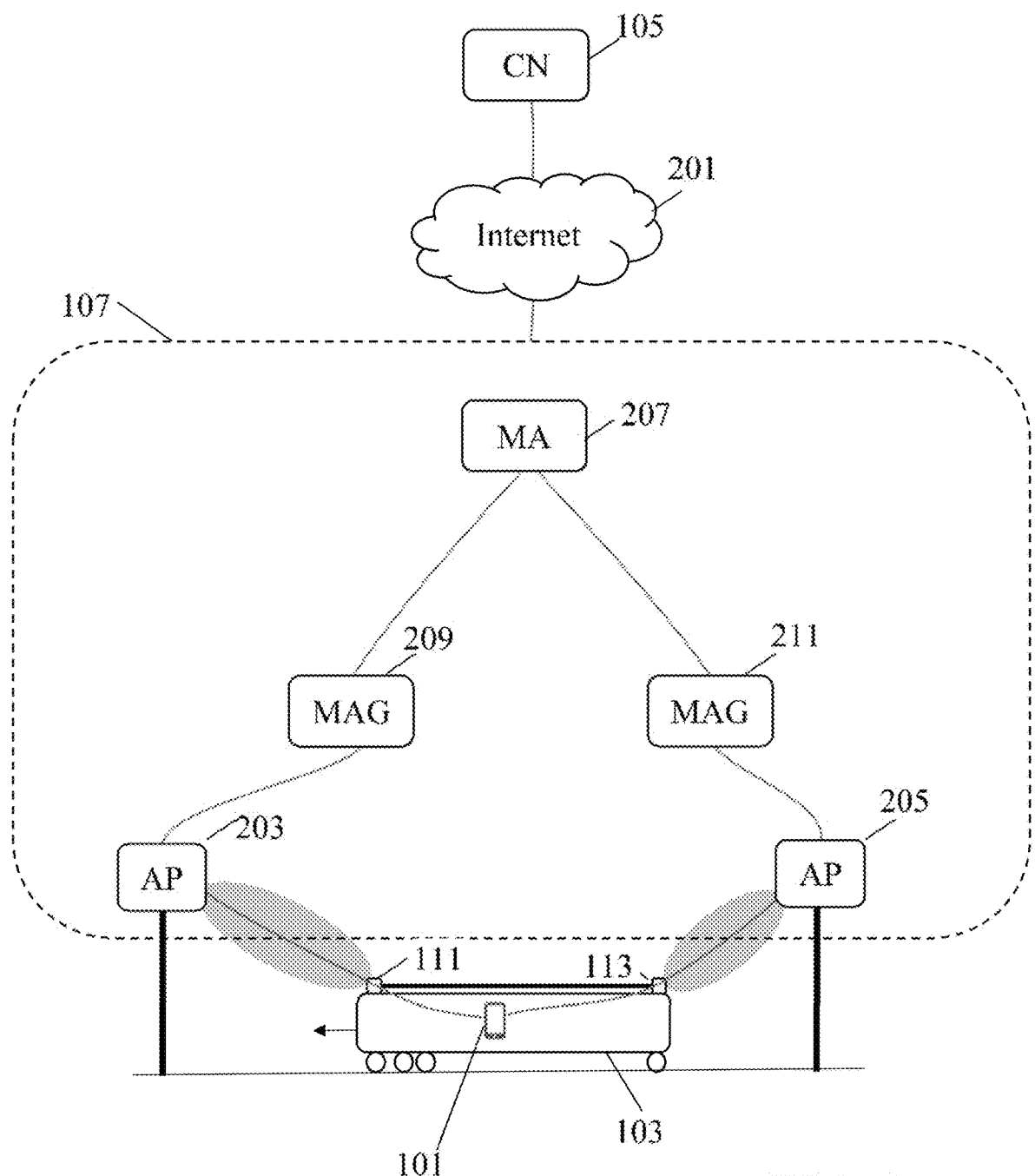
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast-moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109, 203, 205 may be substantially colocated and coupled together through network entities that allow short routing paths between them.

Figure 3:
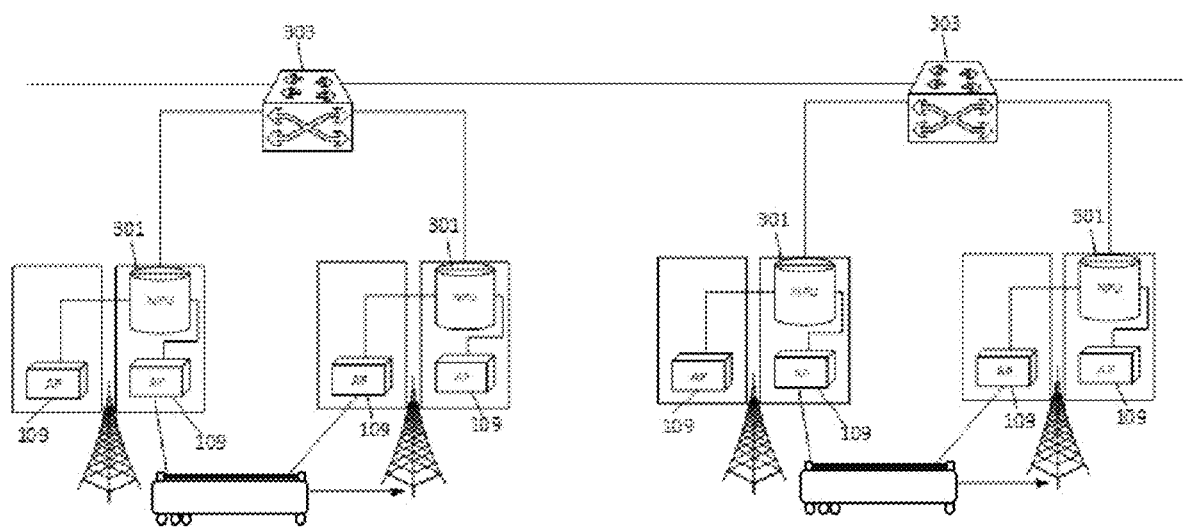
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
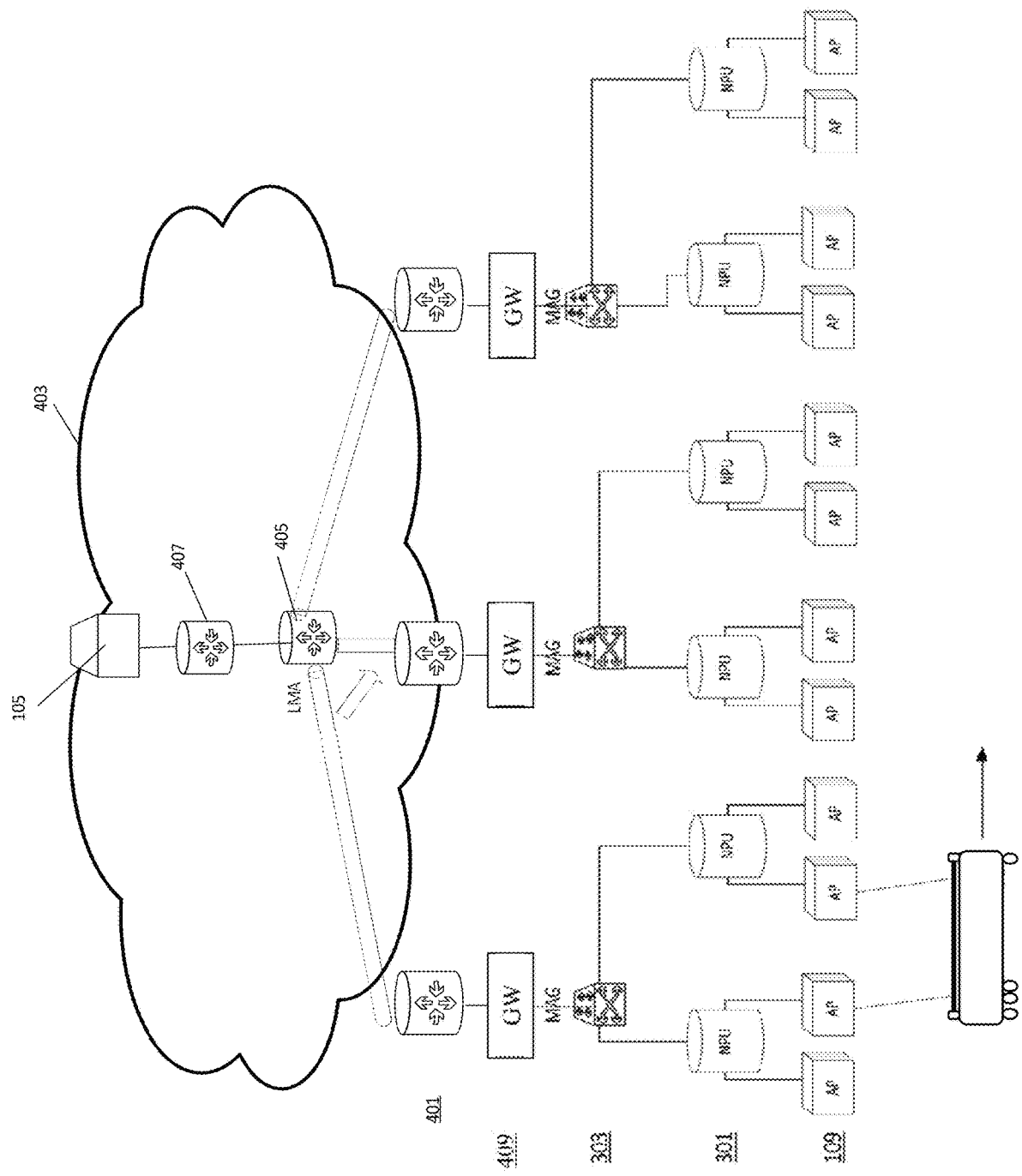
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
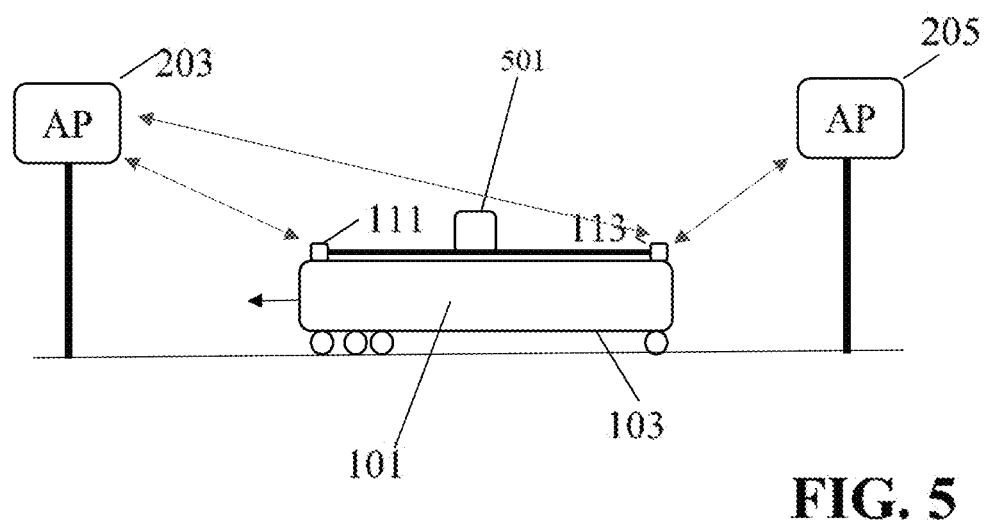
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
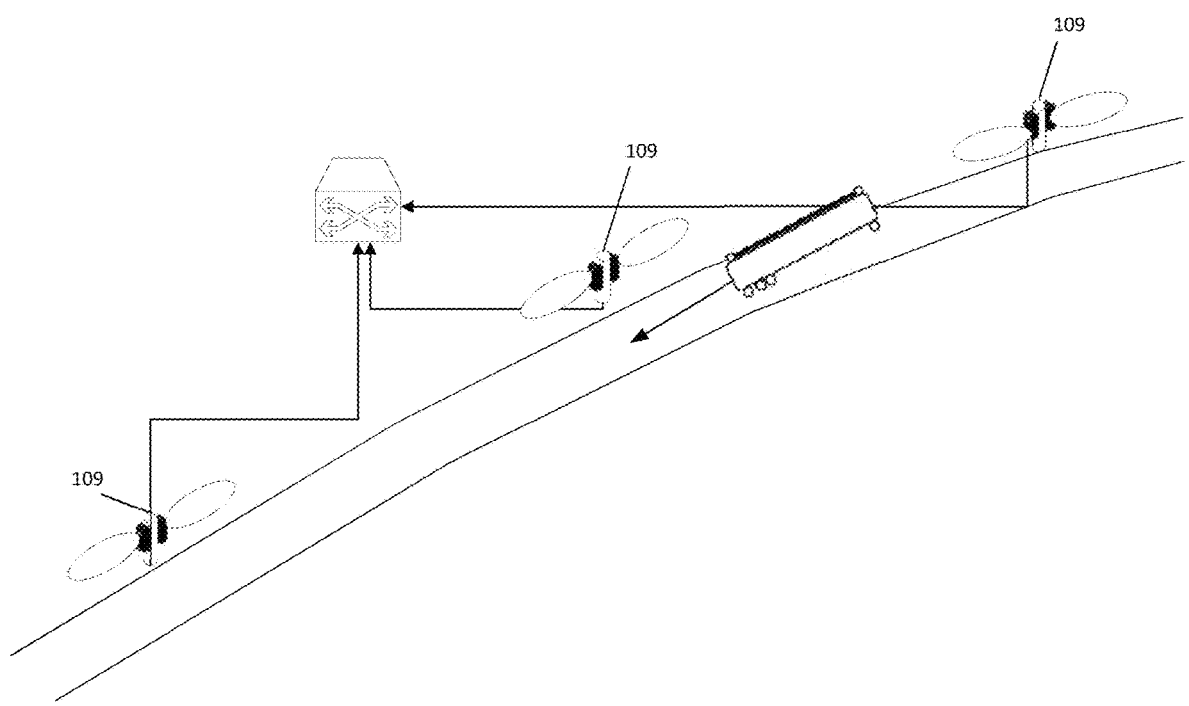
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along a predetermined route such as in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

The beamforming of the directional antennas of the access points may in some embodiments allow for variations in the beam directions for the main beam. However, in many such embodiments, the beam directions may be limited to an interval, such as for example an azimuth interval with a range no larger than e.g. 180°, 135°, 90°, or even 45°.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the rearward and in the rearward/backwards direction. Similarly, rather than having a single wireless modem towards the back of the vehicle/train, there may be two wireless modems forming beams respectively in the rearward and in the rearward direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

A forward direction may be a direction that has a positive dot product with a direction of movement/travel for the vehicle. The forward direction may be a direction within a 180° interval centered on a direction of forward movement/travel. In some embodiments, the forward direction may be within a more limited interval, such as within a 45°, 60°, or 75° interval centered on the direction of movement/travel.

The forward direction of movement/travel may be a nominal direction corresponding to a nominal forward direction for the vehicle. Typically, vehicles such as trains, cars, busses, lorries, boats etc. are designed to have a nominal forward direction. The nominal forward direction may be a nominal forward direction of travel. The nominal forward direction of travel may typically be a center direction of travel for a range of forward directions of travel possible by the vehicle.

A rearward direction may be a direction that has a negative dot product with a direction of movement/travel for the vehicle. The rearward direction may be a direction within a 180° interval centered on a direction opposite of forward movement/travel. In some embodiments, the rearward direction may be within a more limited interval, such as within a 45°, 60°, or 75° interval centered on the direction opposite of movement/travel.

The rearward direction of movement/travel may be a nominal direction corresponding to a nominal rearward direction for the vehicle. Typically, vehicles such as trains, cars, busses, lorries, boats etc. are designed to have a nominal rearward direction. The nominal rearward direction may be a nominal rearward direction of travel. The nominal rearward direction of travel may typically be a center direction of travel for a range of rearward directions of travel possible by the vehicle.

A forward direction may be a direction that has a positive dot product with a direction of movement/travel for the vehicle. The forward direction may be a direction within a 180° interval centered on a direction of forward movement/travel. In some embodiments, the forward direction may be within a more limited interval, such as within a 45°, 60°, or 75° interval centered on the direction of movement/travel.

The forward direction of movement/travel may be a nominal direction corresponding to a nominal forward direction for the vehicle. Typically, vehicles such as trains, cars, busses, lorries, boats etc. are designed to have a nominal forward direction. The nominal forward direction may be a nominal forward direction of travel. The nominal forward direction of travel may typically be a center direction of travel for a range of forward directions of travel possible by the vehicle.

A rearward direction may be a direction that has a negative dot product with a direction of movement/travel for the vehicle. The rearward direction may be a direction within a 180° interval centered on a direction opposite of forward movement/travel. In some embodiments, the rearward direction may be within a more limited interval, such as within a 45°, 60°, or 75° interval centered on the direction opposite of movement/travel.

The rearward direction of movement/travel may be a nominal direction corresponding to a nominal rearward direction for the vehicle. Typically, vehicles such as trains, cars, busses, lorries, boats etc. are designed to have a nominal rearward direction. The nominal rearward direction may be a nominal rearward direction of travel. The nominal rearward direction of travel may typically be a center direction of travel for a range of rearward directions of travel possible by the vehicle.

Figure 7:
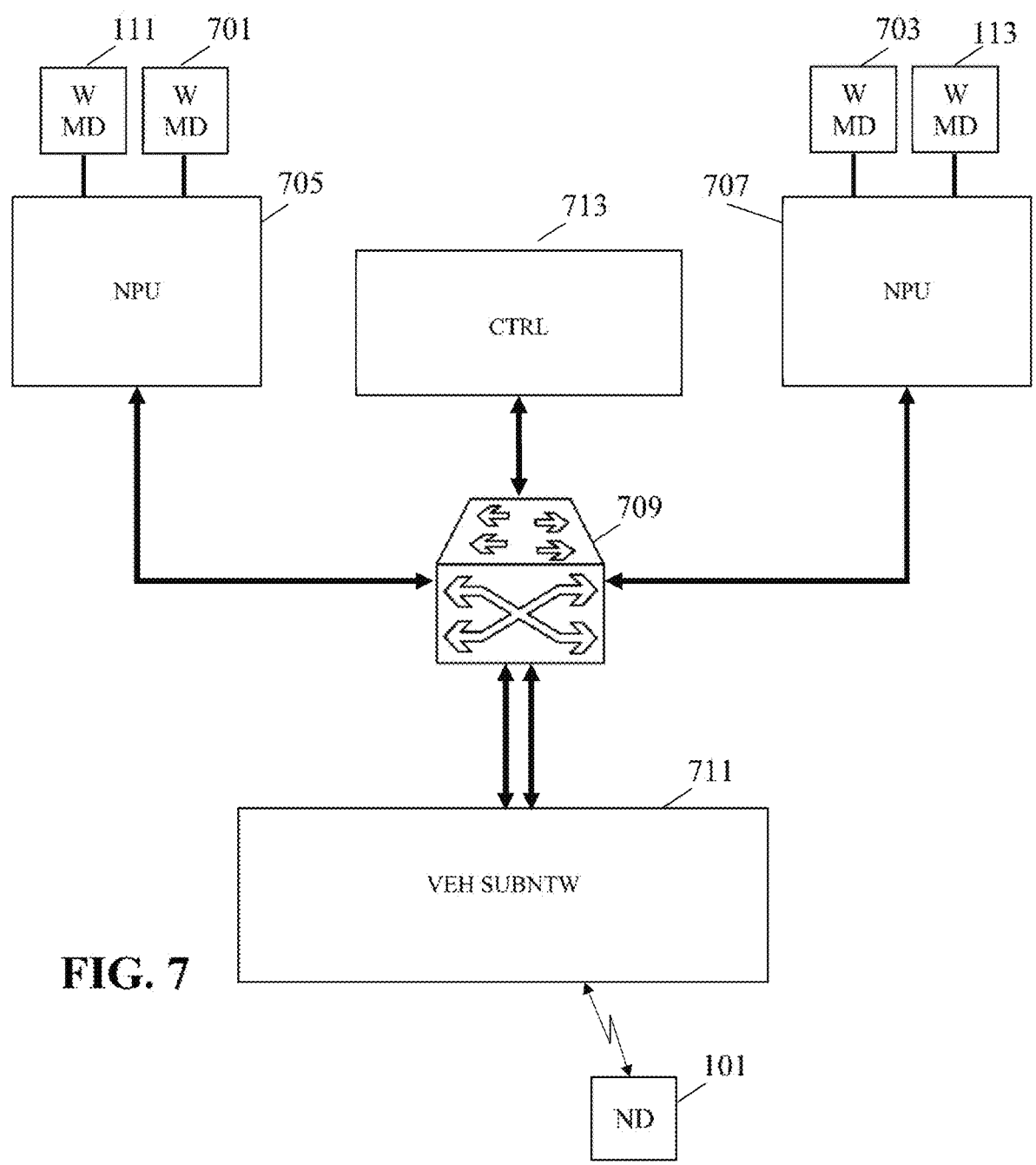
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which is located on the vehicle/moves with the vehicle.

In the example of FIG. 7, the vehicle network comprises four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle-based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a train, and may itself comprise WiFi access points, routers etc.

Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as specifically in a forward direction or range of directions and a rearward direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the rearward direction of the vehicle and the other being pointed in the rearward direction of movement.

Similarly, the other two co-located modems 113, 703 may employ directional antennas that are also directed in opposite directions, specifically in the direction of movement and in the opposite direction (forward/rearward). This may result in two wireless modems 111, 703 having beams formed generally in the forward direction (direction of movement) and two modems 113, 701 having beams formed generally in the rearward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as is well known in the art. As another example, more mechanical solutions may be used. For example, a horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the rearward direction may both be suitable for establishing a wireless link with an access point 109 further ahead along the route/track. Similarly, the two wireless modems having beams pointing in the rearward direction may both be suitable for establishing a wireless link with an access point 109 being further rearward along the tracks.

Figure 8:
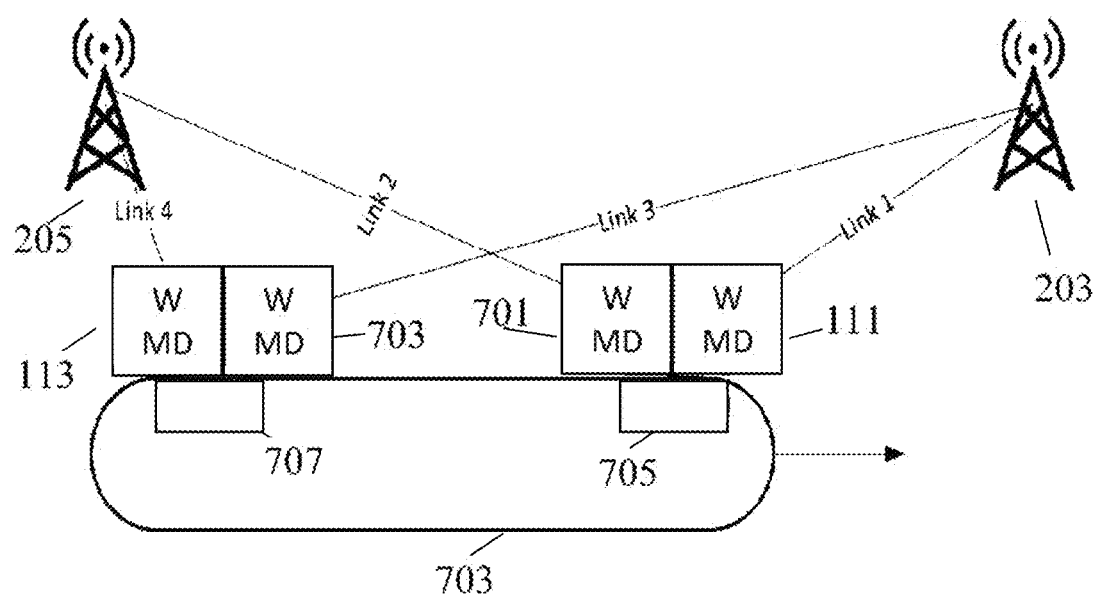
FIG. 8 illustrates an example of elements of a wireless communication system in accordance with some embodiments of the invention.
Figure 9:
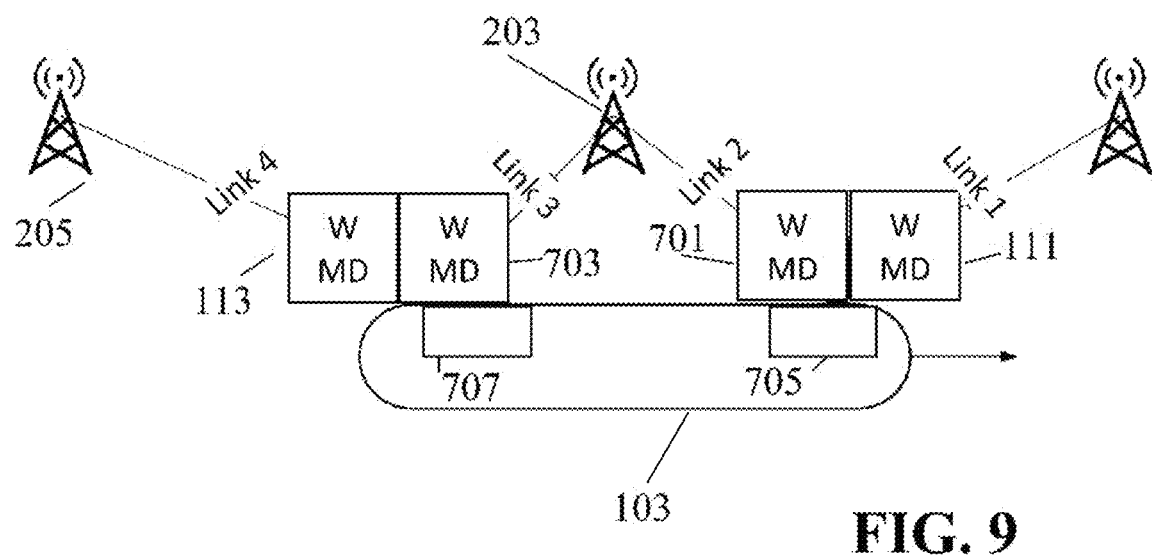
FIG. 9 illustrates an example of elements of a wireless communication system in accordance with some embodiments of the invention.

Similarly, the beam steering may be towards an access point rearward of the vehicle/train 103 and this may indeed be simultaneous with another of the colocated wireless modems steering a beam towards a forward access point. Thus, often a situation may occur where one set of colocated wireless modems have established links with respectively a rearward and rearward access point and thus forms beams in substantially opposite directions. At the same time, the other set of colocated wireless modems may have established links with respectively a rearward and rearward access point and thus also form beams in substantially opposite directions. Further, one pair of non-colocated wireless modems may form beams towards the rearward access point and thus substantially in the same rearward direction, and another pair of non-colocated wireless modems may form beams towards the rearward access point and thus substantially in the same rearward direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

The vehicle may typically comprise a plurality of sets of colocated wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the rearward direction and one wireless modem facing in the rearward direction. In such scenarios, wireless modems in different sets being arranged to form beams in corresponding and typically substantially in the same directions will be referred to as aligned wireless modems.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle. In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and rearward facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

As mentioned, a major challenge for mm wave radio communication systems in general, and for systems supporting fast moving vehicles in particular, is that of how to optimize communication over the air interface. The wireless communications and links between the access points and wireless modems are subject to very fast and very substantially changing radio conditions and the communication capacity and reliability that can be achieved is typically constrained by the ability of the system to effectively adapt to the current conditions. For mm wave radio communication link communication, the effective coverage area for each access point is typically quite small leading to access points being close to each other and with systems typically requiring many access points to cover a desired area or route.

In many mm wave radio communication link communication systems supporting mobility using a plurality and often relatively large number of access points, the achievable link quality to different access points often change quickly and substantially, and the reliable communication with the moving vehicle is changed by a series of relatively frequent link changes. In many systems, including IEEE 802.11ad mm wave radio communication link communication systems, links are continuously terminated and new links setup to new access points as the vehicle moves through the different coverage areas of the access point. In order to support an efficient process and to provide a more reliable communication and more effective resource usage, it is desirable for the changes in links to be as fast as possible.

Typically for many mm wave radio communication link communication systems, the delay in setting up a new link is to a large degree determined by the time it takes to detect and identify a suitable target access point for a new link to be setup. In particular, in systems such as IEEE 802.11ad, stations identify a suitable access point for a potential new link setup based on a scanning/search for beacon transmissions from the access points. If a station detects a suitable beacon transmission, it initiates a setup of a new mm wave radio communication link by transmitting a setup request message to that access point using a suitable access channel.

In order to achieve efficient link management, it is therefore desirable that the scan is as fast as possible. This is in particular important as the stations are typically not able to perform scans at the same time as they are supporting an active link (this would require multiple radio circuits). Therefore, the scan can typically not proceed until the previous mm wave radio communication link has been terminated and the station is not actively supporting any communication.

For example, in the previously described system, each of the wireless modems may after a link has terminated proceed to initiate a scan process in order to find a target access point for setting up a new link.

Unfortunately, scanning for suitable beacon transmissions tend to be a relatively slow process in systems such as IEEE 802.11ad. This is partially due to the fact that beacon transmissions are only transmitted in relatively short time slots. In particular, in IEEE 802.11ad systems, each access point is allocated a frequency channel and this frequency channel is divided into different time intervals of a repeating time frame known as a Beacon Interval BI. The repeating time frame includes a beacon time interval used for beacon transmissions known as a Beacon Header Interval BHI for IEEE 802.11ad, and a time interval used for data transmissions, known as a Data Transmission Interval DTI for IEEE 802.11ad.

Figure 10:
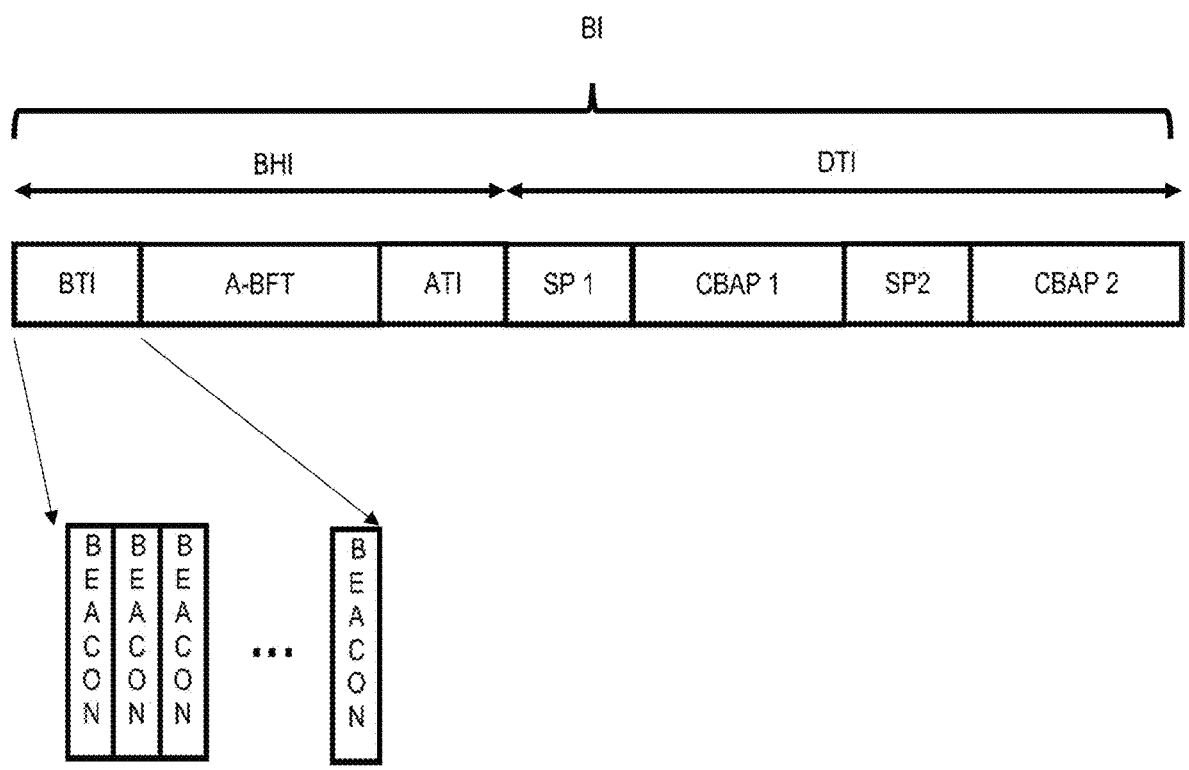
FIG. 10 illustrates an example of a repeating time frame for a wireless communication system in accordance with some embodiments of the invention.

The beacon transmissions occur during time slots of the beacon time interval. In IEEE 802.11ad, the BHI includes a time interval, known as a Beacon Time Interval, BTI, comprising beacon time slots for transmission of beacon data, a time interval, known as association beamforming training time A-BFT, for transmission of beamforming training data, and an a time interval, known as an Announcement Transmission Interval ATI, for transmission of. An example of a Beacon Interval for IEEE 802.11ad is shown in FIG. 10

In some systems, a beacon transmission may be repeated in multiple time slots within a beacon time interval. For example, in IEEE 802.11ad, the access point may retransmit the beacons in different directions in different beacon time slots, and specifically the access point may be capable of transmitting beacons in different sectors served by the access point.

A station seeking to detect and identify a candidate access point will scan for beacon transmissions and will typically sequentially scan the frequency channels on which access points may transmit beacons. For each frequency channel, it will seek to detect and receive a beacon transmission. However, as the beacon transmissions are only transmitted relatively infrequently, such as typically only once per sector per BI for an IEEE 802.11ad system, it may take some time for a beacon to be received even if the transmission from the access point reaches the station. However, if the number of different frequency channels is limited and the speed of link setup is not too critical, this may be acceptable. For example, IEEE 802.11ad specifies only six different frequency channels and most IEEE 802.11ad systems are not particularly sensitive to link setup times (e.g. due to only using a standard limited set of frequency channels).

In the described system, the communication between the wireless modems and the access points may however not only be given by the frequency channel and the repeating time frame but in addition each access point may be associated with a specific transmission scheme selected from a set of transmission schemes. Thus, each access point may communicate over the air interface in accordance with a transmission scheme selected from a set comprising a plurality of transmissions schemes. The data transmissions, and specifically the transmissions of data during the data transmission interval, are performed in accordance with the transmission scheme.

Different transmissions schemes may for example correspond to different frequency offsets within a channel or to transmissions with different bandwidths, and only a fraction of the available bandwidth within a frequency channel may be used. In order to receive a transmission, the receiver must apply the specific parameters of the transmission scheme used, such as the correct frequency offset and bandwidth. Accordingly, when scanning for beacon transmissions, a station must search over not just the possible frequency channels but also over all of the potential transmission schemes that may be used.

Different access points may accordingly communicate using different transmission schemes or sub-channels. A wireless modem seeking to detect a new access point for link setup will need to try to receive a beacon transmission that may be on any of the sub-channels, i.e. it may be using any of the frequency channels and transmission schemes. This may very substantially increase the duration of the scan and this may render the approach suboptimal or even unusable for systems supporting fast mobility and frequent link changes.

The issue may be further exacerbated in systems using beamforming. In such systems, the quality of communication that can be achieved is highly dependent on the beamforming used, and transmitting a simple omnidirectional beacon signal will therefore typically not provide a good indication of the achievable performance for a link being setup with the access point. An access point may therefore, as described, transmit the beacons sequentially in different directions/sectors using suitable beamforming. This may provide additional information to the system, such as indicating in which sector the wireless modem is present, but may also increase the time between beacon transmissions in the individual sector, thereby potentially increasing the time required for a scan.

As an example, for a combination of six frequency channels and fifteen transmission schemes a total of 90 subchannels need to be scanned and this has been found to in practice to often result in scan times in excess of a minute. This is highly unsuitable for fast mobility support and indeed in some systems a fast moving vehicle, such as a train, may only be in the coverage of one cell for a duration of a couple of minutes.

In the described system, an approach is adopted which may substantially reduce the duration of link setup, and specifically of beacon scanning. The approach may lead to much improved mobility support, a more efficient resource usage, more reliable and higher throughput data communication etc.

In the described systems, a hierarchical approach of beacon transmissions is used where the access points transmit beacons using different transmission schemes and specifically using both a default common transmission scheme and a dedicated transmission scheme which is also used for transmission of data during the data transmission intervals. The wireless modems may use a scan approach which uses both beacons to identify suitable target access points for a new mm wave radio communication link setup.

A beacon transmission may be a broadcast transmission, and indeed the term beacon may be replaced by the term broadcast. In many embodiments, a beacon transmission may be a broadcast transmission with a fixed power level and/or transmission parameters. In many embodiments, the beacon transmissions may be repeated across multiple beams or a single quasi-omni beam. In many embodiments, beacon transmissions may be a periodic transmission to aid in discovery of the entity transmitting the beacon and/or the network by new clients. A transmission of a beacon data set by an access point may be a transmission/broadcast of control and/or management data for detection of the access point by remote stations/wireless modems.

Figure 11:
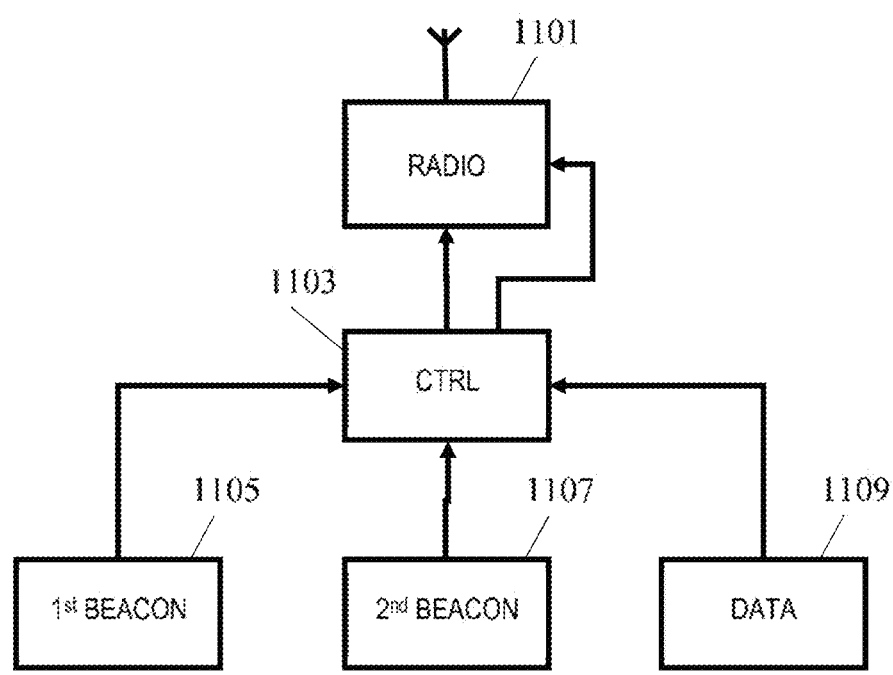
FIG. 11 illustrates an example of elements of an access point for a wireless communication system in accordance with some embodiments of the invention.

FIG. 11 illustrates an example of elements of an access point 109 in accordance with some embodiments of the invention. The access point may specifically be an access point 109 of the system described with reference to FIGS. 1-9 (and similarly all of the access points of the described systems may employ the approaches described with reference to FIG. 11).

The access point 109 comprises a radio circuit 1101 which can communicate in a frequency channel selected from a plurality of frequency channels using a transmission scheme selected from a plurality of transmission schemes.

For the communication system, a plurality of frequency channels is defined with each frequency channel being defined by a frequency bandwidth or frequency mask within which transmissions from or to the access point must be performed. The frequency channels are selected as distinct and often substantially non-overlapping. Thus, interference between access points is reduced by the communications being in different frequency channels. Each of the access points is assigned one frequency channel in accordance with a suitable frequency plan.

For an IEEE 802.11ad communication system a total of six frequency channels are available with the bandwidth of each frequency channel being 2 GHz (with a specific frequency mask being defined relative to a center frequency for the frequency channel).

Further, in the described system each access point is not just assigned a frequency channel but is also assigned a set of transmission schemes, and typically a single transmission channel, which are selected from a set of possible transmission schemes used in the communication system.

The different transmission schemes may correspond to different parameters for transmissions within the assigned frequency channels, i.e. the different transmission schemes represent different transmission parameters but the resulting transmissions fit within the frequency channel assigned to the access point (i.e. within the frequency bandwidth or mask define for the frequency channel).

In the specific example, the different transmission schemes correspond to different frequency bandwidths and/or different frequency offsets (for radio transmissions in accordance with the transmission scheme).

The bandwidth of a transmitted radio signal has a bandwidth that may depend on the symbol rate, modulation scheme, error correcting coding etc. In many embodiments, at least some of the transmission schemes correspond to different bandwidths. For example, using a reduced symbol rate may result in a frequency bandwidth which is only half of the bandwidth of the frequency channel. Using a different modulation format with more data bit per transmitted data symbol may e.g. result in a reduced bandwidth of only, say a quarter of the bandwidth of the frequency channel.

In some embodiments, the center frequency or carrier frequency of the transmissions may vary between different transmission schemes. In some embodiments, at least some of the different transmission schemes have different frequency offsets, e.g. of the carrier/center frequency of the transmissions (from the access points or the wireless modems) relative to a center frequency of the frequency channel.

In many embodiments, the bandwidth of the transmissions will even for the transmission schemes with the widest bandwidth have a bandwidth that is smaller than the bandwidth of the frequency channel. This may typically provide a small margin ensuring that the transmissions fit within the frequency mask. For example, for IEEE 802.11ad, the signal bandwidth tends to be slightly smaller than the frequency channel bandwidth.

In some embodiments, a small frequency offset may be applied to some access points with the frequency offset being different for different access points. Although this may not result in a significant difference in the overlap between spectrums for access points assigned the same frequency channel, the small frequency offset may result in an improved overall interference mitigation by improving the SIR (signal to interference ratio) by a few decibels. This effect is achieved due to the frequency offset making it easier to detect specific training or pilot sequences in the transmissions. For example, frequency offsets can be selected such that specific training sequences of different access points may be substantially orthogonal to each other. In many embodiments, the frequency offset may facilitate differentiation between transmissions from different access points using different frequency offsets. The exact frequency offsets will depend on specific properties of the signals including the bandwidth. Different offsets have in the approach been used for different transmission schemes with the system being able to select an appropriate offset for the desired effect.

Thus, the different transmission schemes result in different frequency intervals or frequency spectrums being employed within a given frequency channel. The frequency spectrums of different transmission schemes may be very different and possibly non-overlapping (e.g. covering different halves of quarters of the bandwidth of the frequency channel) or may be only slightly different with a large overlap and with only a small frequency offset.

Each combination of a frequency channel and a transmission scheme thus defines a transmitted frequency spectrum/ used frequency interval which is different for different combinations. Thus, the combination of a frequency channel and transmission scheme is equivalent to a sub-channel, and each transmission scheme can be considered to represent a sub-channel of the frequency channel. The combinations of frequency channel and transmission scheme will accordingly also be referred to as frequency subchannels, and a transmission scheme for a frequency channel may be referred to and considered equivalent to a subchannel of that frequency channel.

As a specific example, the set of possible transmission schemes/subchannels may include fifteen subchannels:
BWT_SUBCHANNEL_FULL=0,
BWT_SUBCHANNEL_HALF,
BWT_SUBCHANNEL_HALF_R,
BWT_SUBCHANNEL_HALF_L
BWT_SUBCHANNEL_QUARTER,
BWT_SUBCHANNEL_QUARTER_R_0,
BWT_SUBCHANNEL_QUARTER_R_1,
BWT_SUBCHANNEL_QUARTER_L_0,
BWT_SUBCHANNEL_QUARTER_L_1,
BWT_SUBCHANNEL_FULL_1, −125 MHz
BWT_SUBCHANNEL_FULL_2, −110 MHz
BWT_SUBCHANNEL_FULL_3, −55 MHz
BWT_SUBCHANNEL_FULL_4, +55 MHz
BWT_SUBCHANNEL_FULL_5, +110 MHz
BWT_SUBCHANNEL_FULL_6, +125 MHz In this example, the first nine transmission schemes represent different frequency intervals of the frequency channel (full channel, three possible half bands, five possible quarter bands) and the last six transmission schemes correspond to different frequency offsets for a full bandwidth channel.

In the system, each access point may be assigned a specific sub-channel, i.e. frequency channel and transmission scheme combination, and may proceed to transmit and receive signals in accordance with the assigned sub-channel/ combination.

The radio circuit 1101 is coupled to a controller 1103 which is arranged to control the receiving and transmitting functions of the radio circuit 1101. In particular, the controller 1103 may set the receive and transmit parameters of the radio circuit 1101 to be appropriate for the assigned sub-channel combination, i.e. it may set the data rate, modulation scheme, carrier frequency etc. as appropriate.

In addition, the controller 1103 may control the operation of the radio circuit 1101 to be in accordance with a repeating transmission frame that specifically comprises a beacon time interval and a data time interval. The controller 1103 may in accordance with the repeating time frame control when appropriate data is provided to the radio circuit 1101 for transmission and when the controller 1103 extracts relevant received data from the radio circuit 1101 (and it may specifically switch the radio circuit 1101 between receiving and transmitting configurations).

The controller 1103 may also control the time slot structure applied in the repeating time frame by controlling the timing of transmitting and receiving data.

The controller 1103 may accordingly control the radio circuit 1101 to transmit and receive data over the air interface during time slots of the data time interval The controller 1103 is also arranged to control the transmissions during the beacon time interval and specifically it may control the transmissions of beacons, adaptive beam training sequences, etc. as appropriate for the specific embodiments.

In the specific embodiment, the controller 1103 is specifically arranged to transmit beacon data sets where each data set comprises data that may be used by remote stations/ wireless modems to determine whether the access point is a suitable access point for supporting the station/wireless modem.

A beacon data set may be a broadcast of a set of data (typically a data packet) and may also be referred to as a broadcast data set. The transmission of a beacon data set is typically using a predetermined fixed power level and beam shape.

In many embodiments, a beacon data set is transmitted in a time slot of the beacon time interval. In some embodiments, the same beacon data set may be transmitted multiple times in each beacon time interval and specifically the same beacon data set may be transmitted in each of a plurality of time slots with the different transmissions being in different directions and sectors.

In the approach, two different types of beacon transmissions are employed. A first beacon data set is transmitted using the frequency channel assigned to the access point and a common transmission scheme that is common for transmissions of first beacon data sets from a plurality of access points, and possibly for all access points of the system. The common transmission scheme is (at least for some access points) different from the transmission scheme assigned for communication during the data time interval.

A second beacon data set is transmitted using the frequency channel assigned to the access point and the transmission scheme that is assigned to the access point for data transmissions, i.e. the second beacon data set is transmitted using the same subchannel/combination that is also used when communicating data during the data time interval. Thus, whereas the first beacon data set is transmitted using a common transmission scheme that is different from the transmission scheme used for data communication during the data time interval, the second beacon data set is transmitted using the same transmission scheme as that used for communication during the data time interval.

The controller 1103 is coupled to a first beacon circuit which is arranged to provide the first beacon data set to the controller 1103 which may then control the radio circuit 1101 to transmit the first beacon data set in one or more time slots of the beacon time interval using the common transmission scheme.

The beacon data set may comprise various data that may be useful for the wireless modem in performing link management and particularly in setting up a new link. The first beacon data set may for example include all data known from IEEE 802.11ad beacon transmissions. Data may for example include an identification of the access point, capabilities supported by the access point, security relation information, modes of operation etc.

In the described approach, the first beacon data set further includes an indication of a subset of transmission schemes used by a group of the access points, including possibly all access points of the system. The first beacon data set may thus include data identifying a subset of the transmission schemes that are used by the access point and by other access points of the group of access points. The subset of transmission schemes may not necessarily include all transmission schemes that are used by the group of access points (or by all access points in the system) as the access point may potentially not be aware of all possible transmission schemes used. In some embodiments, the subset of the transmission schemes may be combined with a frequency channel, i.e. the subset of transmission schemes may be a subset of combinations of a frequency channel and transmission scheme, i.e. a subset of subchannels.

The first beacon data set may thus include an information element with data that identifies the transmission schemes/subchannels that are used by access point in the system. In some embodiments, the subset may be complete and include all transmission schemes/subchannels used in the system but in many embodiments, the subset is not complete and may not include all transmission schemes/subchannels used.

The controller 1103 is further coupled to a second beacon circuit 1107 which is arranged to provide the second beacon data set to the controller 1103 which may then control the radio circuit 1101 to transmit the second beacon data set in one or more time slots of the beacon time interval using the dedicated transmission scheme assigned to the access point for communication during the data time interval.

In some embodiments, the beacon data set may only include minimal data, such as an access point identification. However, in many embodiments, the second beacon data set may include various data that may be useful for the wireless modem in performing link management and particularly in setting up a new link. The second beacon data set may typically include all data known from IEEE 802.11ad beacon transmissions. The second beacon data set may in particular include legacy data that allows legacy modems to perform link management based only on the second beacon data sets without any consideration of the first beacon data set transmitted using the common transmission scheme.

In some embodiments, the second beacon data set may also comprise an indication of the subset of transmission schemes. Indeed, whereas the first and second beacon data sets may be different in many embodiments, they may also in some embodiments include the same data, and indeed may be identical (but transmitted using different transmission schemes).

The controller 1103 is additionally coupled to a data circuit 1109 which is arranged to provide any data to be transmitted during the data time interval to the controller 1103 which may then control the radio circuit 1101 to transmit the data set as appropriate in appropriate time slots of the data time interval using the dedicated transmission scheme assigned to the access point. The data circuit 1109 may further retrieve any data received from remote stations during the data time interval.

Figure 12:
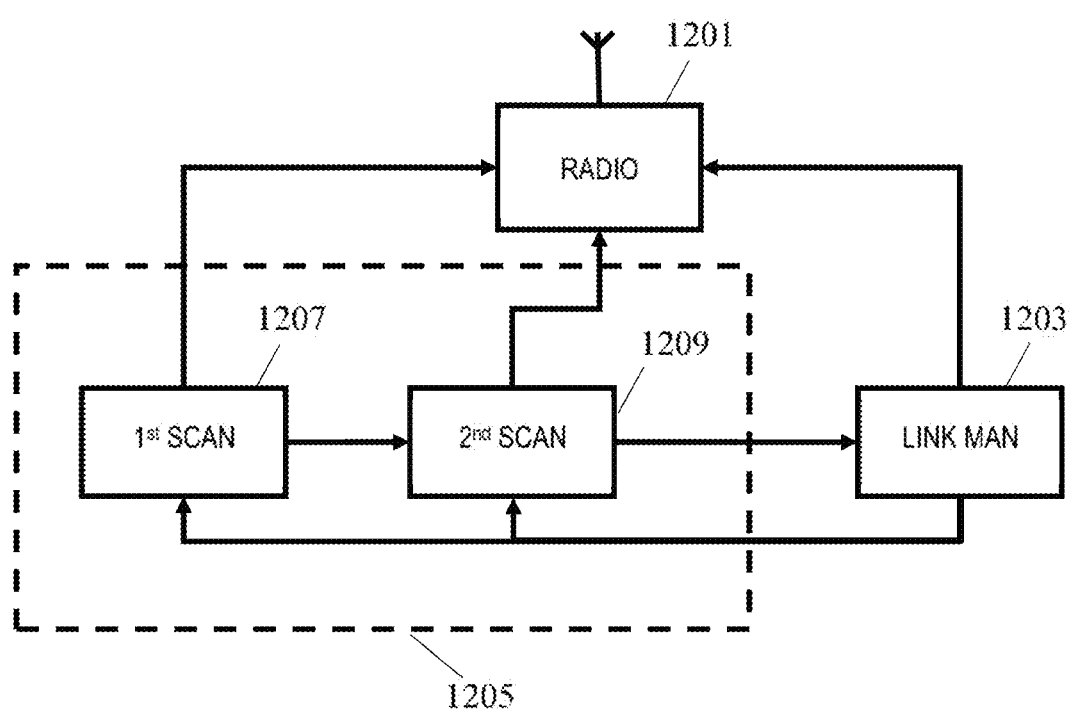
FIG. 12 illustrates an example of elements of a wireless modem for a wireless communication system in accordance with some embodiments of the invention.

FIG. 12 illustrates some examples of a wireless modem which specifically is one of the wireless modems 111, 113, 701, 703 of the described system. In the following, the function will be described with reference to wireless modem 111 but it will be appreciated that some or all of the wireless modems of the system may and typically will also include such functionality and operate as described.

FIG. 12 illustrates functional elements of the wireless modem 111 involved in link management and specifically link setup operations. It will be appreciated that the wireless modem may include a number of other functions for receiving and transmitting data, controlling operations, interfacing with other devices and the vehicle network 107 etc. as is well known in the prior.

The wireless modem 111 comprises a wireless modem radio circuit 1201 which is arranged to communicate with access points over the air interface as is known in the art. The wireless modem radio circuit 1201 can be configured to transmit and receive data using any of the frequency channels and any of the transmission schemes, i.e. it can communicate using any of the combinations and subchannels that may be used by an access point of the system.

The wireless modem radio circuit 1201 comprises a link manager 1203 which is arranged to manage the mm wave radio communication links between the wireless modem 111 and access points. Specifically, the link management is arranged to determine if mm wave radio communication links terminate/drop, and to initiate new mm wave radio communication links being setup.

In many systems, if the wireless modem 111 does not currently have an active link with an access point, it will typically continuously seek to setup a new link. For this purpose, the wireless modem 111 comprises a scan circuit 1205 which is coupled to the wireless modem radio circuit 1201 and the link manager 1203. The scan circuit is arranged to search for suitable beacon transmissions from access points as will be described in more detail in the following.

In the wireless modem 111, the link manager 1203 may accordingly terminate, or detect termination of, an ongoing mm wave radio communication link. For example, the link manager 1203 may detect that the link quality, e.g. measured in terms of signal to noise ratio, bit error rate, data throughput etc., drops below a given threshold and in response it may consider the link to no longer be able to support communication. In response, it may stop communication using the link and instead proceed to control the scan circuit 1205 to initiate a search for a target access point for potentially setting up a new mm wave radio communication link. The scan circuit 1205 may thus control the radio circuit 1101 to perform the scan/search for a new access point.

The scan circuit 1205 comprises a first search circuit 1207 which is arranged to perform a first search for first beacon data sets that are transmitted from an access point using the common transmission scheme.

The common transmission scheme may typically be a predetermined transmission scheme that is known to all wireless modems (and access points) of the system. The first search circuit 1207 may accordingly control the radio circuit 1101 to receive on a frequency channel using the common transmission scheme. It may then seek to detect a first beacon data set. If no beacon data set is detected within a given time interval (typically longer than the maximum duration between consecutive transmissions of first beacon data sets from an access point), the first search circuit 1207 can proceed to the next frequency channel and repeat attempting to detect a first beacon data set still using the common transmission scheme. The first search circuit 1207 may accordingly proceed to search for a target access point using the common transmission scheme until a first beacon data set is received. In some embodiments, the first beacon data set is also transmitted using a common and known frequency channel and the first search circuit 1207 may be arranged to continuously monitor the common subchannel of the common frequency channel and common transmission scheme.

When a beacon data set is received, the first search circuit 1207 may extract the indication of the subset of transmission schemes used by the access points. The first search circuit 1207 may thus specifically from the received first beacon data set determine the subset of dedicated transmission schemes that are used by the access points of the system. In many practical communication systems, this subset of used transmission schemes will be much smaller than the total number of possible transmission schemes.

The scan circuit 1205 further comprises a second search circuit 1209 which is fed information of the subset of the transmission schemes that are being used by the communication system. The second search circuit 1209 then proceeds to perform a second search for second beacon data sets transmitted from the plurality of access points using the dedicated transmission schemes. The second search is adapted based on the indication of the subset of transmission schemes that are used by the access points.

For example, the second search may sequentially search for second beacon sets transmitted using different transmission schemes by sequentially selecting transmission schemes from the indicated subset and for each transmission scheme the second search circuit 1209 may search over all possible frequency channels and detect any second beacon sets that can be received. The scan circuit 1205 may proceed to do this for all transmission schemes that are indicated to be included in the subset.

At the end of the second search, the scan circuit 1205 may thus have detected and received none, one, or more second beacon data sets. It may then provide the link manager 1203 with information of the outcome of the search, and specifically it may provide data reflecting the combinations/subchannels for which a second beacon data set has been detected. It may further provide information of a detection quality for each of the detected second beacon data set, such as a signal strength, signal to noise ratio, error rate etc. The scan circuit 1205 may in some embodiments provide additional information for the received second beacon data set or associated access point, such as an access point identity, an operational parameter (e.g. power level, modulation format, etc.), a location indication, a priority level, a beam direction parameter (e.g. in which direction (backwards/forwards) along a track the access point forms a beam), etc.

The link manager 1203 may then proceed to initialize setting up a mm wave radio communication link to a target access point from which a second data set has been detected.

Thus, the link manager 1203 may proceed to initialize the setup of a new mm wave radio communication link with one of the access points that have been detected by the scan circuit 1205, i.e. with one of the access points from which a second beacon data set has been transmitted.

The link manager 1203 may in many embodiments proceed to initiate a new mm wave radio communication link by transmitting a link setup request message to the selected target access point in an access request time interval supported by this access point. The transmission may typically be performed using the subchannel that has been determined by the scan circuit 1205 for the target access point, i.e. the combination of frequency channel and transmission scheme for which the second beacon data set was detected is used when transmitting the access request message.

As a specific example, the link manager 1203 may in accordance with the IEEE 802.11ad approach initiate the setting up of a new mm wave radio communication link by choosing one of the subchannel that has been determined by the scan circuit 1205 and initiating a beamforming (A_BFT) setup by exchanging a series of SSW/SSW-ACK/SSW-Feedback frames. Once the beamforming has been established, the system may move to an optional ATI period, which can be used to request any polls/grants, and then on to exchanging association frames (association request and association response) over one or multiple Bis after which the link is said to be established.

The selection of which of the detected access points to consider a target access point will depend on the preferences and requirements of the individual embodiment. In case the scan resulted in the detection of only a single candidate access point, the link manager 1203 may proceed to select this as the target access point with which to seek to setup a new link. If two or more access points are detected by the scan, the link manager 1203 may proceed to select the target access point in accordance with a selection criterion suitable for the desired performance and operation. In many embodiments, the link manager 1203 may detect the detected access point for which the highest link quality is detected and reported by the scan circuit 1205. In some embodiments, the selection algorithm may be a more complex algorithm considering multiple parameters such as quality, priority, location, beam direction etc. for the access point as well as possibly parameters of the wireless modem, such as location etc.

The approach may accordingly provide a hierarchical two-phase approach for detecting suitable target access points and setting up new links. Rather than the wireless modem having to search through all possible frequency channels and transmission schemes which may take an extremely long time, the wireless modem may perform a first search considering only a single transmission scheme. The detection of the first beacon data set further provides data that allows a limited search for the second beacon data set over a subset of transmission schemes. This second beacon data set uses the same transmission scheme as used during the data time interval and thus receiving the second beacon data set may allow link quality and communication properties that closely reflect those of the data time interval to be determined. The approach may thus significantly reduce the scan/search time for beacon transmissions when searching for a new target access point while at the same time allowing accurate information that directly reflect the conditions of the mm wave radio communication link being setup.

In some embodiments, the first search may be terminated when a first beacon data set has been detected and the wireless modem may directly move to the second search. Thus, the wireless modem may not perform a full search to check whether first beacon data sets can be received from different access points or that the best and most suitable access point has been identified. Rather, the first search may simply seek to detect a first beacon data set in order to detect the presence of at least one possible suitable access point and to obtain information of the subset of transmission schemes used. This may result in a very fast first search in many scenarios as it is not only performed over very few options (e.g. over the frequency channels) but is further in many cases terminated before all options have been searched. Further, the second search may be performed over all subchannels that are represented by the transmission schemes of the indicated subset. This may result in multiple second beacon data sets being detected and may allow the wireless modem to identify the best target access point candidate (in accordance with a suitable criterion). Thus, both fast and reliable and thorough searching can be achieved.

As previously mentioned, the beacon data sets are typically transmitted multiple times in different directions/sectors to reflect the effects of the directionality of the antennas. The first beacon data set may be transmitted in multiple time slots with each transmission being in a different direction and using a different radiation/beam pattern. Similarly, the second beacon data set may be transmitted in multiple time slots with each transmission being in a different direction and using a different radiation/beam pattern.

In some embodiments, one or more of the access points is arranged to transmit first beacon data sets using a broader beam than a beam used for transmitting the second beacon data set.

For example, in some embodiments, the access point may be arranged to transmit the first beacon data set in fewer time slots (i.e. fewer times) than for the second beacon data set but with the transmissions of the first beacon data set using a broader beam than the second beacon data set. For example, the first beacon data set may be transmitted with three repetitions in three different time slots using a beam shape with a beam width of around 120° (with the beam width being determined as the angle interval for which the beam gain is above a threshold considered to correspond to an acceptable gain for transmitting the beacon data set). However, the second beacon data set may be transmitted with nine repetitions in nine time slots but using a beam width of 40°.

Such an approach may provide an improved and/or faster detection in many scenarios and specifically may make the initial "blind" search for the first beacon data set faster while providing the second search to generate a more accurate indication of the quality that can be achieved for a link of the data time interval which will typically use the narrower beam widths for communication.

In some embodiments, the power level for the transmissions of the first beacon data sets using the wider beams may be increased relative to the power level for the transmissions of the second beacon data set using the narrower beam widths to compensate for differences in the effective gains of the beams.

In some embodiments, the second beacon data set may not comprise any information related to the subset of transmissions schemes. For example, the second beacon data sets may only comprise standard information for current IEEE 802.11ad beacons without any additional information related to the specific transmission schemes used by the system, and indeed typically without any information being provided about transmissions schemes/subchannels and/or without any information being provided about transmissions from other access points, such as about frequency channels and/or transmission schemes used by other access points. Such an approach may in many embodiments provide improved legacy and backwards compatibility. It may specifically allow legacy stations to detect and associate with access points based only on the second beacon data sets and legacy access procedures.

However, in some embodiments, the second beacon data set may also comprise an indication of the subset of transmission schemes. Specifically, the data transmitted in the second beacon data set may be the same as of the first beacon data sets, and indeed in some embodiments the first and second beacon data sets may be identical for a given access point or possibly even for different access points (but at least for some/most of the access points transmitted using different transmission schemes).

This may allow more flexibility and an improved operation in many embodiments. For example, a wireless modem that has previously received information of the subset of transmission scheme, may directly skip the first search and go to the second search. This may result in the wireless modem receiving a second beacon data set containing an indication of the subset. This received subset can then be compared to the stored subset which can be updated, adapted, or validated in response to the comparison. For example, transmission schemes of the stored subset can be removed if not included in the received subset, or new transmission schemes can be added if included in the received subset. The approach may allow a faster scan operation in many embodiments while still allowing flexibility and means for dynamically changing the used transmission schemes. The approach may also in many embodiments provide improved reliability.

The search strategy adopted by the wireless modem, and specifically how the scan circuit 1205 adapts the search in response to the subset of transmission schemes may be different in different embodiments.

As previously mentioned, in many embodiments, the scan circuit 1205 may be arranged to initially search for second beacon data sets transmitted using transmission schemes, or subchannels, comprised in the subset of transmission schemes, or subchannels, indicated in the first beacon data set transmitted from the access point.

In some embodiments, the indication of the subset of transmission schemes may comprise an indication of an order of transmission schemes, and the second search circuit 1209 may be arranged to adapt the second search to search for second beacon data set to follow the order of transmission schemes in this indication.

Thus, not only may the second search circuit 1209 be arranged to initially perform the search using the indicated transmission schemes but it may also perform this search in accordance with an order provided by the first beacon data set.

Such an approach may for example be useful in a scenario in which the wireless modem is arranged to stop the search when a second beacon data set is detected for which a quality measure/estimate is above a given threshold.

For example, the wireless modem may after having detected a first beacon data set proceed to scan for second beacon data set in the order of the transmission schemes indicated in the subset communicated by the first beacon data set. If this results in the detection of a second beacon data set with a sufficiently high quality indication, the wireless modem may proceed to stop the scan and the link manager 1203 may initiate the setting up of a new link to the access point transmitting the detected second beacon data set.

If no second beacon data set is detected with sufficiently high quality, the second search circuit 1209 may proceed to scan all the transmission schemes of the subset and if any second beacon data sets are detected, the link manager 1203 may proceed to setup a new link to the access point of the received second beacon data set for which the quality measure is highest (with this being lower than the threshold required for stopping the scan of the transmission scheme of the subset).

If no second beacon data set is detected after all the transmission schemes have been scanned, the scan circuit 1205 may in some embodiments be arranged to continuously repeat the search over the subset until a second beacon data set is detected.

However, in other embodiments, the scan circuit 1205 may be arranged to proceed to scan transmission schemes that are not included in the subset. Thus, in some embodiments, the second search circuit 1209 is arranged to search over transmission schemes of the set of transmission schemes that are not comprised in the subset of transmission schemes if the second search over the transmission schemes comprised in the subset of transmission schemes does not detect any second beacon data sets.

In such embodiments, all subchannels may thus eventually be scanned until an acceptable second beacon data set is detected but with the scan focusing on the indicated subset by first scanning for these.

In some embodiments, the wireless modem may be arranged to adapt the criterion for setting up a new link dependent on the indication of the subset of transmission schemes. For example, the selection criterion may be biased towards selecting access points for which a second beacon data set is received using a transmission scheme of the subset relative to an access point for which a second beacon data set is received not using the transmission scheme.

In some embodiments, the scan circuit 1205 may be arranged to initiate a second search even if the first search is not successful. For example, if the first search circuit 1207 does not detect any first beacon data set within a given time interval, or e.g. after all frequency channels have been searched, e.g. a predetermined number of times, the scan circuit 1205 may proceed to initiate a second search by the second search circuit 1209, i.e. a search may be performed over other transmission schemes than the common transmission scheme.

In this case the second search may be over all possible transmission schemes. The second search may in the case where no first beacon data set has been detected, i.e. no beacon data set transmitted using the common transmission scheme has been detected, proceed to perform a full search over all possible subchannels. This may provide a reliable search for new access points while at the same time allowing the time to detect a suitable access point to be reduced in many situations and scenarios.

In some embodiments, the second search performed if no first beacon data set is detected may simply be over all possible transmission scheme and frequency channel combinations in accordance with a random or predetermined order.

However, in some embodiments, the second search may in such scenarios be adapted e.g. based on stored information. In some embodiments, the second search circuit 1209 may be arranged initially search over transmission schemes of a default subset of transmission schemes if the first search does not detect any first beacon data sets. The default subset may be a predetermined subset or e.g. a subset that has been manually entered by a user. The default subset may for example reflect a frequency plan or e.g. a local configuration. For example, the transmission schemes that are used by access points covering a predetermined route along which the vehicle is moving may be entered manually and these may be searched first in the second search after a failure to detect first beacon data sets.

However, in many embodiments the second search circuit 1209 may be arranged to determine the default subset in response to previously received first beacon data sets. The wireless modem may store the subsets that are received from access points. It may further combine these into a default subset that includes all transmission schemes previously indicated by an access point. The second search circuit 1209 may in this case proceed to initially search over the transmission schemes of this default set. If this does not result in any beacon data set being detected, the second search circuit 1209 may proceed to search over other transmission schemes.

Thus, if no first beacon data set is detected, the second search circuit 1209 may in many embodiments be arranged to perform the second search over transmission schemes that are different from the common transmission scheme. This second search may in particular include searching over transmission schemes that are not included in any subset of transmission schemes indicated by a first beacon data set (including received in previous first beacon data sets).

In some embodiments, the scan circuit 1205 may be arranged to determine whether a stored default set of transmission schemes is valid or not. For example, a default set of transmission schemes may be valid if it corresponds to a subset indicated by a first beacon data set received within a given time interval, i.e. if the information is not too old. If the default set is considered to be valid, the second search may be performed in dependence on the default set but if it is considered to not be valid the second search may be performed without considering the default set, e.g. a search may be performed over all subchannels.

In some embodiments, the first beacon data set may further comprise an indication of a subset of frequency channels that used by the plurality of access points. In some embodiments, a plurality of access points, e.g. corresponding to all access points in the system or to all access points in a given area, may be constrained to only use a subset of the plurality of frequency channels that are potentially available to the system, e.g. in accordance with a standard being adhered to.

For example, in accordance with the IEEE 802.11ad specification, the access points may use any frequency channel out of six standardized frequency channels. However, a given frequency plan for a communication system, or e.g. a given area covered by the system, may only utilize, say, three different frequency channels. In this case, a conventional approach would be to scan/search over all six frequency channels.

However, in accordance with the described approach, the first beacon data set, and indeed also the second beacon data set, may include an indication that only a subset of frequency channels are utilized and it may specifically indicate which frequency channels are used. In the specific example, the first beacon data set (and/or second beacon data set) may comprise data identifying the subset of frequency channels being used, and it may specifically identify the three-frequency channel being in use.

The scan circuit 1205 may be arranged to adapt the first search circuit 1207 and/or the second search circuit 1209 to perform the first and/or second search respectively in response to the indication of the indication of the subset of frequency channels. Specifically, in some embodiments, the first and/or second search may be performed only over the frequency channels that are included in the subset. In some embodiments, the order of the search over frequency channels may be adapted dependent on the subset of frequency channels and specifically the first and/or second search may be adapted such that the frequency channels belonging to the subset of frequency channels is searched first. In this case, frequency channels not belonging to the subset may potentially only be searched if no beacon data sets were received for the frequency channels comprised in the subset.

Thus, in some embodiments, the first and/or second search circuit is arranged to adapt the first/second search in response to the indication of the subset of frequency channels.

In the specific example where only three frequency channels are employed in the frequency plan, the first beacon data sets may include an indication of the three frequency channels. The scan circuit 1205 may store the three frequency channels and control the second search circuit 1209 to only (or first) search the three frequency channels indicated to be in use. Further, the next time a first search is initiated, this may be controlled to only (or first) scan the three-frequency channel indicated to be in use.

Thus, in some embodiments, a subset of combinations/sub-channels may be determined as the set of combinations/sub-channels that are formed by the possible combinations of the frequency channels included in the indicated subset of frequency channels and the transmission schemes included in the indicated subset of transmission schemes. The second search may then be adapted to first scan/search these combinations/sub-channels. If one or more second beacon data sets are detected in this search, the link management may proceed to select an access point originating one of the detected second beacon data sets. If no beacon data set is detected for any of the combinations/sub-channels, the scan circuit 1205 may in some embodiments proceed to scan combinations/sub-channels that are not included in the subsets or may e.g. in some embodiments terminate the search at this point (and thus only the combinations/subchannels included in subsets are scanned).

In some embodiments, the subset may indicate the combinations of frequency channels and transmission schemes used, i.e. the indication may be directly of the subset of subchannels/combinations that are used and the operation, and specifically the second search, may be adapted as described but with the references to transmission schemes being replaced by references to subchannels or combinations of frequency channels and transmission schemes.

In some embodiments, the first beacon data set for an access point of the plurality of access points comprises an indication of the transmission scheme that is used by the access point. Thus, the first beacon data set transmitted using the common transmission scheme may further provide information of the transmission scheme that is used by the access point for transmissions during the data time interval and for the transmission of the second beacon data set.

The scan circuit 1205 may in some embodiments be arranged to adapt the second search in response to the indication of the transmission scheme used by the access point. In particular, in some embodiments, it may initialize the second search to first detect if a second beacon data set can be received for the combination of the frequency channel for the detected first beacon data set and the transmission scheme indicated in the detected first beacon data set to be used by the access point.

This may allow the second scan circuit 1205 to very quickly determine indications of the link quality for a link being setup with this access point, i.e. it may quickly determine if the second beacon data set from this access point can be received and what the radio quality for this reception is. Thus, it may quickly determine an estimate for the link quality that will be achieved by a data link being setup with this access point since the second beacon data set and the communications of the data time interval use the same subchannel and transmission scheme.

If the indication, is that the second beacon data set is received with a sufficiently high quality, the scan circuit 1205 and/or link manager 1203 may terminate any further search and move directly to setting up a new link with the access point. Thus, rather than perform a full search for all possible subchannels that are in use and which may potentially be detected by the wireless modem, the wireless modem may directly abandon the search and setup a link with the detected access point. This may in many scenarios provide advantageous operation and performance. In particular, it may provide a substantially faster setup of a new mm wave radio communication link in many embodiments and therefore reduce the overhead or downtime associated with switching the serving access point.

Although it is possible that the approach may result in the wireless modem not detecting the optimum access point as the target access point for a new link, the risk of this is typically small in many practical systems where the distance between access points make it likely that only one access point can be received with a very high quality at any position. Situations where multiple access points can be detected, and a more accurate scan is useful, may typically correspond to overlapping coverage areas that tend to not be close to any access point. Thus, such scenarios are typically associated with all detectable access points being received with a lower link quality. Thus, by selecting the threshold for the link quality for the second beacon data set necessary to abandon the scan and move directly to setting up a new link, the system can be adapted such that full second searches are limited to situations where they are more likely to result in a different target access point than the one for which the first beacon data set was detected.

In some embodiments, the information of which transmission schemes and/or frequency channels are used in a given frequency plan may be provided from a remote server to each access point. For example, a central network control node may provide a user interface allowing a user to manually implement a frequency plan by allocating a frequency channel and transmission scheme to each access point. Messages may then be transmitted to each access point to indicate which frequency channel and transmission scheme is allocated to the access point. In addition, an indication of the transmission schemes that are used by the frequency plan may be provided. Further, in some embodiments, the central network node may also provide information of a subset of frequency channels that are used by the frequency plan. The access points may then generate the data for the first beacon data set (and typically also for the second beacon data set) to include indications of these subsets.

In other embodiments, the frequency channel and/or the transmission scheme may be individually selected at each access point e.g. based on automated algorithms using evaluating the radio environment or on manual inputs at the individual access point. In such cases, the selected frequency channel and/or transmission scheme may be forwarded to a central node for distribution to other access points or may e.g. be directly exchanged/distributed by the access points themselves.

In some embodiments, one or more of the access points may be arranged to receive indications of previously used transmission schemes from wireless modems. In many embodiments, the access point(s) may also receive indications of previously used frequency channels.

In the wireless modem of FIG. 12, the link manager 1203 may be arranged to store a set of transmission schemes and typically frequency channels that have previously been used for communications with (different) access points. In many embodiments, the link manager 1203 may store a list/set of the subchannels, i.e. the combinations of frequency channels and transmission schemes, that have been used by the wireless modem when communicating with access points. Specifically, when a new link is setup, the subchannel used may be added to the stored list if not already included in this. In some embodiments, the link manager 1203 may be arranged to also delete transmission schemes/frequency channels/subchannels from the set in accordance with any suitable criterion. For example, if a subchannel has not been used for more than a given duration, the link manager 1203 may remove the subchannel from the list.

The link manager 1203 may be arranged to transmit the stored set to the access points. For example, whenever a new link is setup, the link manager 1203 may transmit the currently stored list of used transmission schemes/frequency channels and/or subchannels to the new access point.

An access point may in such embodiments, receive information of which transmission scheme/frequency channel/subchannel have previously been used by the wireless modem, and thus may receive information of which transmission scheme schemes/frequency channels/subchannels that are used by other access points in the communication system.

In many embodiments, the data circuit 1109 is arranged to generate the indication of the subset of transmission schemes that is transmitted in the first (and typically second) beacon data set in response to the indications of previously used transmission schemes.

For example, the data circuit 1109 may store a set of reported transmission schemes/frequency channels/subchannels. Whenever a new set is received from a wireless modem accessing the access point, the data circuit 1109 may extract the indicated transmission schemes/frequency channels/subchannels and proceed to add any that are not included to the stored set. As for the wireless modem, the data circuit 1109 may be arranged to also delete transmission schemes/frequency channels/subchannels from the set in accordance with a suitable criterion. For example, if a subchannel has not been reported for more than a given duration, the data circuit may remove the subchannel from the stored set.

The demodulation circuit 1007 may generate the subset of used transmission schemes that are transmitted in the beacon data sets by including all the transmission schemes that are stored in the reported set. Similarly, in some embodiments, the beacon data set may not just indicate the subset of transmission schemes but may also indicate the frequency channels, or specifically the combinations/subchannels.

Thus, in some embodiments, each access point may individually and separately obtain information of what transmission schemes etc. are used in the communication system and generate the indications thereof to be transmitted in the beacon data sets of the access point. However, in other embodiments, the received information may also be transmitted to a central node and/or distributed to other access points. The central node and/or individual access points may accordingly combine sets from different access points thereby increasing the probability that all used transmission schemes/frequency channels/subchannels are included.

The previous description has focused on a scenario where both the end node and the wireless modem were mobile and indeed located on the same vehicle. However, whereas highly suitable for such an implementation, the described approach and principles may also be applied to other embodiments, and specifically to embodiments where the wireless modem and the end node may be fixed. For example, the approach may be highly suitable for Fixed Wireless Access (FWA) approaches.

In such embodiments, the wireless modems may for example be part of distribution nodes that may act as interconnecting network nodes between access points and fixed end nodes. The mm wave radio propagation environment may change quickly due to changing conditions, such as e.g. caused by moving objects, changing weather conditions, etc.

Therefore, although fixed, it may often occur that a current link to an access point is not of sufficient quality whereas it may be possible that a link to another access point can be setup. In this case, the current link may be terminated (e.g. using the approaches and principles previously described for the mobile embodiment) and the wireless modem may proceed to scan for a new access point. As it is desirable for the interruption in the provided service (e.g. Internet access) to be as short as possible, the described approach may advantageously be applied with the access points transmitting first and second beacon data sets using different transmission schemes.

The approach may be particularly suitable for applications such as FWA as it in many scenarios may allow for a larger number of transmission schemes to be employed without unacceptably increasing the scan time and link switch delay. The use of more transmission schemes may mitigate interference between different access points thereby allowing a more compact distribution of access points.

In more detail, the to handle the changing channel conditions and to handle other deployments or newly added equipment a two-level strategy may be employed: changing the beams (beamforming) and changing the frequency channels. Changing the beams is automatically taken care by the MAC without needing any user input, whereas changing channels is trickier, this is where the use of subchannels may be useful to differentiate to other systems using the standard frequency channels. So, the operating channels of the network may subject to change and can be one of the different subchannels, and this may render the approach of mitigating higher scan time very advantageous.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

The invention claimed is:

1. A communication system for supporting communication between an end node and a remote correspondent node via a fixed network, the communication system comprising:
   a plurality of wireless access points of the fixed network, each wireless access point having a directional antenna arrangement for mm wave radio communication using directional beams,
   a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links;
   wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points; and
   at least some access points of the plurality of access points are arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

2. The communication system of claim 1, wherein the plurality of transmission schemes comprise transmission schemes having at least one of: different frequency bandwidths; and different frequency offsets.

3. The communication system of claim 1, wherein the second beacon set comprises an indication of the subset of transmission schemes.

4. The communication system of claim 1, wherein the wireless modem comprises:
   a first search circuit arranged to perform a first search for first beacon data sets transmitted from the plurality of access points using the common transmission scheme;
   a second search circuit arranged to perform a second search for second beacon data sets transmitted from the plurality of access points using the set of transmission schemes, the second search being adapted in response to the indication of the subset of transmission schemes used by the plurality of access points; and
   a link management circuit arranged to initialize setting up a mm wave radio communication link to a target access point from which a second data set has been detected.

5. The communication system of claim 4, wherein the second search circuit is arranged to adapt the second search to initially search for second beacon data sets transmitted using transmission schemes comprised in the first subset of transmission schemes.

6. The communication system of claim 5, wherein the second search circuit is arranged to search over transmission schemes of the set of transmission schemes not comprised in the subset of transmission schemes if the first search does not detect any first beacon data sets.

7. The communication system of claim 4, wherein the second search circuit is arranged to search over transmission schemes of the set of transmission schemes not comprised in the subset of transmission schemes if the second search over the transmission schemes comprised in the subset of transmission schemes does not detect any second beacon data sets.

8. The communication system of claim 4, wherein the indication of the subset of transmission schemes used by the plurality of access points comprises an indication of an order of transmission schemes, and the second search circuit is arranged to adapt the second search to search for second beacon data set to follow the order of transmission schemes in the indication of the subset of transmission schemes.

9. The communication system of any of claim 4, wherein the link management circuit is arranged to select the target access point from a plurality of target access points from which second data sets have been detected in response to a quality measure determined for the target access points.

10. The communication system of any of claim 4, wherein the first search circuit is arranged to terminate the first search and to start the second search when a first beacon data set has been received.

11. The communication system of claim 4, wherein the second search circuit is arranged to search over all transmission schemes of the set of transmission schemes if the first search does not detect any first beacon data sets.

12. The communication system of claim 4, wherein the second search circuit is arranged to initially search over transmission schemes of a default subset of transmission schemes if the first search does not detect any first beacon data sets.

13. The communication system of claim 12, wherein the second search circuit is arranged to determine the default subset of transmission schemes in response to previously received first beacon data sets.

14. The communication system of claim 1, wherein at least a first access point of the plurality of access points is arranged to receiving indications of previously used transmission schemes from wireless modems, and further comprising a subset circuit for generating the indication of the subset of transmission schemes used by the plurality of access points in response to the indications of previously used transmission schemes.

15. The communication system of claim 1, wherein the first beacon data set comprises an indication of a subset of frequency channels of the plurality of frequency channels used by the plurality of access points.

16. The communication system of claim 1, wherein the first beacon data set for at least a first access point of the plurality of access points comprises an indication of a transmission scheme used by the first access point.

17. The communication system of claim 1, wherein at least one access point of the plurality of access points is arranged to transmit first beacon data sets using a broader beam than a beam used for transmitting the second beacon data set.

18. An access point for a communication system for supporting communication between an end node and a remote correspondent node via a fixed network, the communication system comprising:
  a plurality of wireless access points of the fixed network, each wireless access point having a directional antenna arrangement for mm wave radio communication using directional beams,
  a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links;
  wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points;
  the access point comprising:
  the access point being arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

19. A wireless modem for a communication system for supporting communication between an end node and a remote correspondent node via a fixed network, the communication system comprising:
  a plurality of wireless access points of the fixed network, each wireless access point having a directional antenna arrangement for mm wave radio communication using directional beams;
  wherein each of the access points of the plurality of access points is arranged to communicate during data time intervals using a combination of a frequency channel of the set of frequency channels and a transmission scheme from the set of transmission schemes, the combination of the frequency channel and transmission scheme being different for at least some access points of the plurality of access points; and
  at least some access points of the plurality of access points are arranged to transmit a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and to transmit a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points;

the wireless modem being arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links; and the wireless modem further comprising:

a first search circuit arranged to perform a first search for first beacon data sets transmitted from the plurality of access points using the common transmission scheme;

a second search circuit arranged to perform a second search for second beacon data sets transmitted from the plurality of access points using the set of transmission schemes, the second search being adapted in response to the indication of the subset of transmission schemes used by the plurality of access points; and a link management circuit arranged to initialize setting up a mm wave radio communication link to a target access point from which a second data set has been detected.

20. A method of operation for a communication system for supporting communication between an end node and a remote correspondent node via a fixed network, the communication system comprising:

a plurality of wireless access points of the fixed network, each wireless access point having a directional antenna arrangement for mm wave radio communication using directional beams, a wireless modem arranged to establish mm wave radio communication links to wireless access points of the plurality of wireless access points using a combination of a frequency channel selected from a set of frequency channels and a transmission scheme selected from a set of transmission schemes and employing a repeating time frame comprising at least a beacon time interval and a data time interval, the mm wave radio communication links supporting a data session between the end node and the remote correspondent node, the wireless modem employing an electronically steerable beamforming directional antennas for establishing the mm wave radio communication links;

the method comprising:

each of the access points of the plurality of access points communicating during data time intervals using a combination of a frequency channel of the set of frequency channels and a transmission scheme from the set of transmission schemes, the combination of the frequency channel and transmission scheme being different for at least some access points of the plurality of access points;

and at least some access points of the plurality of access points transmitting a first beacon data set during beacon time intervals of a frequency channel of the plurality of frequency channels used by the access point, the first beacon data set comprising an indication of a subset of transmission schemes used by the plurality of access points and being transmitted using a common transmission scheme that is common for transmissions of first beacon data sets for the at least some access points, and transmitting a second beacon data set during beacon time intervals of a frequency channel of the plurality of frequency channels used by the access point, the second beacon data set being transmitted using the combination of the frequency channel and transmission scheme used by the access point for transmitting data during data time intervals, the combination of the frequency channel and transmission scheme being different for access points of the at least some of the access points.

* * * * *